(12) United States Patent
Kim et al.

(10) Patent No.: US 9,302,449 B2
(45) Date of Patent: Apr. 5, 2016

(54) HIGH CORROSION RESISTANT HOT DIP ZN ALLOY PLATED STEEL SHEET

(75) Inventors: Sang-Heon Kim, Gwangyang-si (KR);
Young-Sool Jin, Gwangyang-si (KR);
Min-Suk Oh, Gwangyang-si (KR);
Su-Young Kim, Gwangyang-si (KR);
Bong-Hwan Yoo, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 13/824,445

(22) PCT Filed: Dec. 26, 2011

(86) PCT No.: PCT/KR2011/010099
§ 371 (c)(1),
(2), (4) Date: Mar. 18, 2013

(87) PCT Pub. No.: WO2012/091385
PCT Pub. Date: Jul. 5, 2012

(65) Prior Publication Data
US 2013/0183541 A1    Jul. 18, 2013

(30) Foreign Application Priority Data
Dec. 28, 2010 (KR) .................. 10-2010-0137294

(51) Int. Cl.
*B32B 15/01* (2006.01)
*C23C 2/28* (2006.01)
(Continued)

(52) U.S. Cl.
CPC ............ *B32B 15/013* (2013.01); *C23C 2/06* (2013.01); *C23C 2/20* (2013.01); *C23C 2/26* (2013.01);
(Continued)

(58) Field of Classification Search
CPC .... B32B 14/013; B32B 15/04; B32B 15/013; C23C 2/04; C23C 2/06; C23C 2/20; C23C 2/26; C23C 2/28; C23C 28/30; C23C 28/32; C23C 28/321; C23C 28/34; C23C 30/00; C23C 30/005; Y10T 428/12979; Y10T 428/12972; Y10T 428/12799; Y10T 428/12535; Y10T 428/27; Y10T 428/12993
USPC ........ 428/659, 621, 658, 681, 684, 685, 687, 428/332, 336, 335, 334, 340, 341, 704
See application file for complete search history.

(56) References Cited

U.S. PATENT DOCUMENTS

| 3,505,043 A | 4/1970 | Lee et al. |
| 6,235,410 B1 | 5/2001 | Komatsu et al. |

(Continued)

FOREIGN PATENT DOCUMENTS

| CN | 101558182 A | 10/2009 |
| JP | 02-175852 | 7/1990 |

(Continued)

OTHER PUBLICATIONS

Machine Translation, Mizuno et al., JP 2010-275632, Dec. 2010.*
(Continued)

*Primary Examiner* — Michael E La Villa
(74) *Attorney, Agent, or Firm* — The Webb Law Firm

(57) ABSTRACT

Provided is a hot dip zinc (Zn) alloy plated steel sheet having excellent corrosion resistance and surface qualities, and a method of manufacturing the same. For this purpose, provided is a high corrosion resistant hot dip Zn alloy plated steel sheet which includes an underlying steel sheet and a hot dip Zn alloy plating layer, wherein a composition of the hot dip Zn alloy plating layer includes 1 to 3 wt % of aluminum (Al), 1.5 to 4.0 wt % of magnesium (Mg), and Zn and unavoidable impurities as a remainder, in which Al+Mg is in a range of 2.5 to 7.0 wt % and Al: (Al+Mg) ratio is in a range of 0.38 to 0.48, and a method of manufacturing the high corrosion resistant hot dip Zn alloy plated steel sheet.

3 Claims, 2 Drawing Sheets

(51) Int. Cl.
*C23C 2/06* (2006.01)
*C23C 2/20* (2006.01)
*C23C 2/26* (2006.01)

(52) U.S. Cl.
CPC ........... *C23C 2/28* (2013.01); *Y10T 428/12535* (2015.01); *Y10T 428/12799* (2015.01); *Y10T 428/12972* (2015.01); *Y10T 428/12979* (2015.01); *Y10T 428/12993* (2015.01); *Y10T 428/27* (2015.01)

(56) References Cited

U.S. PATENT DOCUMENTS

| | | | |
|---|---|---|---|
| 6,379,820 | B1 | 4/2002 | Komatsu et al. |
| 7,914,851 | B2 | 3/2011 | Kim et al. |
| 2008/0206592 | A1* | 8/2008 | Kim et al. .................... 428/653 |
| 2010/0086806 | A1 | 4/2010 | Koumura et al. |

FOREIGN PATENT DOCUMENTS

| | | | |
|---|---|---|---|
| JP | 08060324 | A | 3/1996 |
| JP | 10226865 | A | 8/1998 |
| JP | 10265926 | A | 10/1998 |
| JP | 2001107213 | A | 4/2001 |
| JP | 3201469 | B2 | 8/2001 |
| JP | 2002-004017 | | 1/2002 |
| JP | 2002-309630 | | 10/2002 |
| JP | 2004-360056 | | 12/2004 |
| JP | 2007-056307 | | 3/2007 |
| JP | 2010275632 | A | 12/2010 |
| KR | 20060076214 | A | 7/2006 |
| WO | 2010/124596 | A1 | 11/2010 |

OTHER PUBLICATIONS

Machine Translation, Watanabe et al., JP 2004-360056, Dec. 2004.*

* cited by examiner

HIGH CORROSION RESISTANT HOT DIP ZN ALLOY PLATED STEEL SHEET

TECHNICAL FIELD

The present invention relates to a zinc (Zn) alloy plated steel sheet used in construction materials, home appliances, or automobiles, and more particularly, to a hot dip Zn alloy plated steel sheet having excellent corrosion resistance and surface qualities, and a method of manufacturing the same by using a hot dip Zn alloy plating bath containing aluminum (Al), magnesium (Mg), and the like.

BACKGROUND ART

Demand for hot dip Zn plated steel sheets has been expanded in the fields of construction materials, home appliances, or automobiles because the manufacturing process thereof is simpler and the price thereof is lower than electrogalvanized steel sheets. In particular, according to a recent increase in the price of Zn, techniques related to a hot dip zinc-aluminum (hereinafter referred to as Zn—Al system) or a hot dip zinc-aluminum-magnesium (hereinafter referred to as Zn—Al—Mg system) alloy plated steel sheet having better corrosion resistance at a lower coating weight in comparison to a hot dip Zn plated steel sheet have been developed and demands for Zn—Al and Zn—Al—Mg systems have increased.

A typical Zn—Al system product may be a Zn-55% Al plated steel sheet. However, since aluminum content in a plating layer, there are limitations in that a sacrificial corrosion protection capability is decreased and corrosion preferentially occurs in a portion exposing underlying metal such as a cutting surface. Also, with respect to hot dip Zn-55% Al plating, the generation of dross in a plating bath may be severe, because the temperature of the plating bath may be high at about 600° C., plating workability may decrease and the lifespan of a facility may be shortened, due to the erosion of components of the facility in the plating bath, such as a sink roll.

With respect to the Zn—Al—Mg system, U.S. Pat. No. 3,505,043 was suggested, and thereafter, Japanese Patent Application Laid-Open Publication No. 8-60324, Japanese Patent Application Laid-Open Publication No. 10-226865, and Japanese Patent No. 3201469 were suggested. The foregoing Japanese patents disclosed that total contents of aluminum and magnesium in plating layers were in a range of 9 wt % to 14 wt %, and the plating layers showed appropriate quality characteristics for construction materials due to excellent corrosion resistance. However, the use of the plating layers for automobiles may be difficult because the surface qualities thereof may deteriorate due to high levels of alloying components, such as aluminum and magnesium, in the plating layers.

Also, a technique exists in Europe, in which the total contents of aluminum and magnesium in a plating layer may be controlled to a lower level in comparison to those in Japan. However, in this case, corrosion resistance may be somewhat decreased.

Meanwhile, in terms of manufacturing, when the contents of aluminum and magnesium are controlled to low levels, a solidification initiation temperature of a Zn—Al—Mg alloy plating layer may be in a range of 400° C. to 420° C., although the temperature may differ somewhat according to the contents of aluminum and magnesium. A final solidification termination temperature of a Zn—Al—Mg ternary eutectic structure is about 340° C. and surface qualities thereof may deteriorate due to the generation of ripple marks caused by a selective oxidation of magnesium in a liquid phase-solid phase temperature range. That is, aluminum and magnesium are concentrated in a molten metal pool unsolidified during a solidification process of the plating layer. The higher the concentration of magnesium is, the easier oxidation occurs and the more non-uniform the fluidity is.

Therefore, a technique for a hot dip Zn—Al—Mg system plated steel sheet, which may secure excellent corrosion resistance and uniform surface qualities while the contents of aluminum and magnesium in a plating layer are controlled to be as low as possible, is required.

SUMMARY OF THE INVENTION

An aspect of the present invention provides a hot dip Zn alloy plated steel sheet having excellent corrosion resistance and surface qualities, manufactured by using a hot dip Zn—Al—Mg system plating bath, and a method of manufacturing the hot dip Zn alloy plated steel sheet.

According to an aspect of the present invention, there is provided a high corrosion resistant hot dip zinc (Zn) alloy plated steel sheet including: an underlying steel sheet; and a hot dip Zn alloy plating layer, wherein a composition of the hot dip Zn alloy plating layer includes about 1 wt % to about 3 wt % of aluminum (Al), about 1.5 wt % to about 4.0 wt % of magnesium (Mg), and Zn and unavoidable impurities as a remainder, in which Al+Mg is in a range of about 2.5 wt % to about 7.0 wt % and Al:(Al+Mg) is in a range of about 0.38 to about 0.48.

According to another aspect of the present invention, there is provided a method of manufacturing a high corrosion resistant hot dip Zn alloy plated steel sheet including: preparing a hot dip Zn alloy plating bath which includes about 1 wt % to about 3 wt % of Al, about 1.5 wt % to about 4.0 wt % of Mg, and Zn and unavoidable impurities as a remainder, in which Al+Mg is in a range of about 2.5 wt % to about 7.0 wt % and Al:(Al+Mg) is in a range of about 0.38 to about 0.48; dipping an underlying steel sheet in the hot dip Zn alloy plating bath to manufacture a plated steel sheet by performing plating; and cooling the plated steel sheet after gas wiping.

The present invention provides a plating bath enabling the manufacturing of a hot dip Zn alloy plated steel sheet having a plated structure, in which a binary Zn—$MgZn_2$ eutectic structure is mainly dispersed in a matrix of a ternary Al—Zn—$MgZn_2$ eutectic structure, and a method of manufacturing the hot dip Zn alloy plated steel sheet, and also provides a hot dip Zn alloy plated steel sheet having a fine surface appearance as well as excellent corrosion resistance through the method. Therefore, a high applicability material, such as a rust-proof steel sheet for construction materials, home appliances, and automobiles, may be anticipated.

BRIEF DESCRIPTION OF DRAWINGS

The above and other aspects, features and other advantages of the present invention will be more clearly understood from the following detailed description taken in conjunction with the accompanying drawings, in which.

BEST MODE FOR CARRYING OUT THE INVENTION

Hereinafter, the present invention will be described in more detail.

First, a hot dip zinc (Zn) alloy plating bath used in the present invention is described in detail.

The hot dip Zn alloy plating bath used in the present invention may include 1 wt % to 3 wt % of aluminum (Al), 1.5 wt % to 4.0 wt % of magnesium (Mg), and Zn and unavoidable impurities as a remainder, in which Al+Mg may be in a range of 2.5 wt % to 7.0 wt % and Al:(Al+Mg) may be in a range of 0.38 to 0.48.

When a content of Al is less than 1 wt %, an effect on the improvement of corrosion resistance may be insufficient and an effect on the prevention of oxidation at a surface portion of the plating bath, which becomes severe due to the addition of Mg, may be insufficient. When the content of Al is greater than 3 wt %, iron (Fe) dissolution from an underlying steel sheet may increase and the weldability and phosphatability of a plating layer may deteriorate. Therefore, the content of Al may be in a range of 1 wt % to 3 wt %.

When a content of Mg is less than 1.5 wt %, an effect on the improvement of corrosion resistance may be insufficient, and when the content of Mg is greater than 4.0 wt %, the management of the plating bath may be difficult because the oxidation of the plating bath and the generation of dross increase in a temperature range of the plating bath to later be described. Therefore, the content of Mg may be in a range of 1.5 wt % to 4.0 wt %.

Both aluminum and magnesium are elements that improve corrosion resistance of a plating layer, and the larger the sum of these elements, the greater the improvement of corrosion resistance in the plating layer may be. However, when a sum of the weight percentages (wt %) of aluminum and magnesium in the plating bath is less than 2.5 wt %, an effect on the improvement of corrosion resistance may be insufficient, and when the sum is greater than 7.0 wt %, the generation of working cracks may be facilitated due to an increase in the hardness of the plating layer, and although corrosion resistance improves, weldability and paintability may deteriorate or an improvement of a treatment method may be required. Therefore, the sum of the weight percentages of aluminum and magnesium may be in a range of 2.5 wt % to 7.0 wt %.

Figure 1:
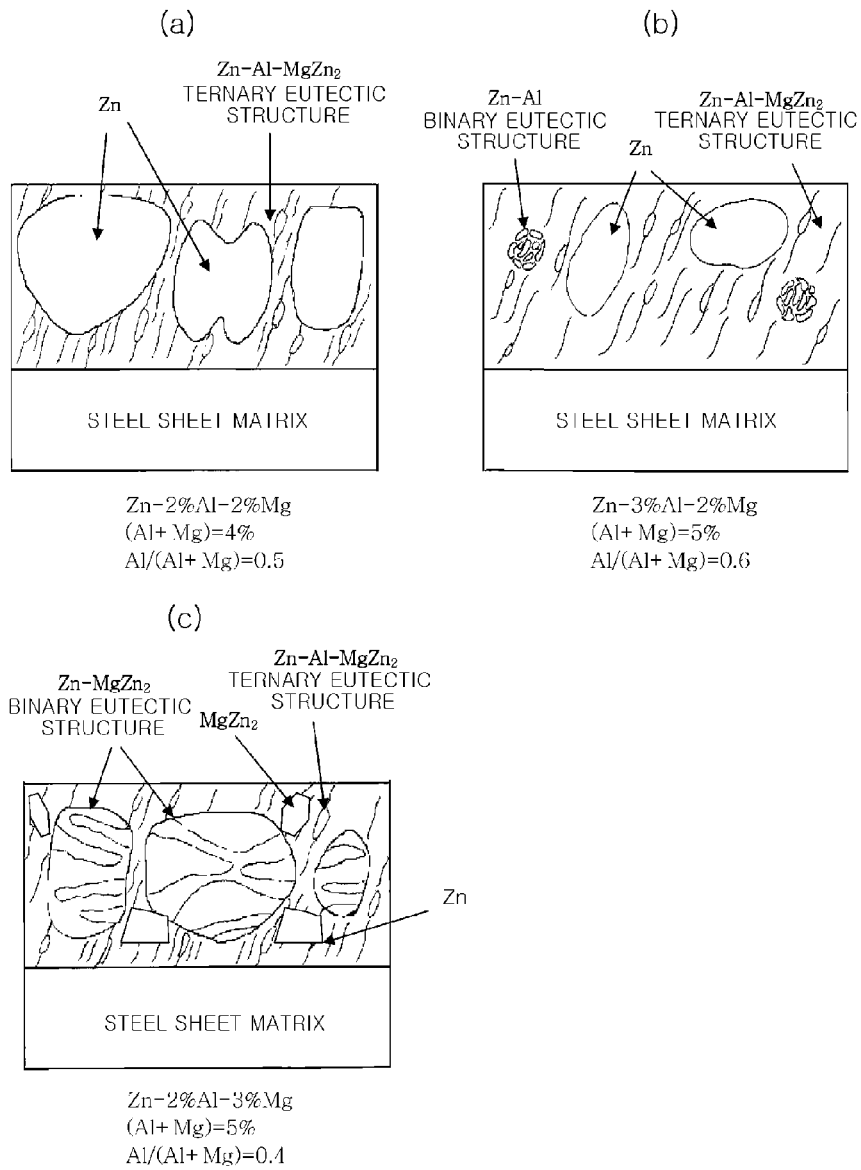
FIG. 1 is a schematic view illustrating a plating layer according to the changes of aluminum (Al) and magnesium (Mg)

The present inventors found, through experimentation, that three types of plated structures are formed and the corrosion resistance of plating layers may be changed according to an Al:(Al+Mg) ratio determined by a concentration ratio of Mg:Al in the foregoing Al and Mg ranges, and three examples thereof are schematized in FIG. 1.

A crystal structure, which may be generated in the foregoing composition ranges of the present invention, may include a Zn single phase, a $MgZn_2$ single phase, a Zn—$MgZn_2$ binary eutectic structure, or a Zn—Al binary eutectic structure in a matrix of Zn—Al—$MgZn_2$ ternary eutectic structure. The foregoing alloy plating layer structure types may be different from composition ratios of components of the plating bath and cooling methods, and differences in corrosion resistance may be generated according to the various structural types.

FIG. 1(a) shows that a coarse Zn single-phase structure is formed in a matrix of a Zn—Al—$MgZn_2$ ternary eutectic structure when the composition of the plating bath is Zn-2Al-2Mg, in which Mg+Al=4 wt %, and Al:(Mg+Al)=0.5. FIG. 1(b) shows that a Zn—Al binary eutectic structure is also formed because the content of aluminum is slightly higher than that of the composition in FIG. 1(a), when the composition of the plating bath is Zn-3Al-2Mg, in which Mg+Al=5 wt %, and Al:(Mg+Al)=0.6. On the other hand, FIG. 1(c) shows that a Zn single phase structure is observed in an amount less than 10%, a portion of $MgZn_2$ in the plating bath may inevitably be included in the plating layer, and a Zn—$MgZn_2$ binary eutectic structure is formed in a matrix of a Zn—Al—$MgZn_2$ ternary eutectic structure, when the composition of the plating bath is Zn-2Al-3Mg, in which Mg+Al=5 wt %, and Al:(Mg+Al)=0.4. The plated structure of FIG. 1(c) is formed when Al:(Mg+Al) is in a range of 0.38 to 0.48.

In the case of (c), in which Al:(Mg+Al) satisfies the range of 0.38 to 0.48, in comparison to the case in which a Zn primary phase is formed as in FIG. 1(a) or the case in which a Zn—Al binary eutectic structure is formed as in FIG. 1(b), corrosion resistance is excellent when $MgZn_2$ is formed, and Mg in the plating layer promotes the formation of simonkolleite ($Zn_5(OH)_8Cl_2$), a dense corrosion product, and thus, corrosion resistance may be improved.

When Al:(Mg+Al) is less than 0.38, oxidation of the plating bath may be severe, defects of the plating layer may be generated due to the floatation of $MgZn_2$ intermetallic particles having a dross form in the plating bath, and also a plated surface may be rough due to the formation of a coarse $MgZn_2$ phase in the plating layer. Also, when Al:(Mg+Al) is greater than 0.48, corrosion resistance may deteriorate due to the formation of a large amount of a Zn single phase in the plating layer as shown in FIGS. 1(a) and 1(b).

A hot dip Zn alloy plating bath of the present invention may include one or more selected from the group consisting of silicon (Si), lithium (Li), titanium (Ti), lanthanum (La), cerium (Ce), boron (B), and phosphorous (P) in an amount of 0.1% or less. When a trace amount of the foregoing components is added, a crystal structure of the plating layer is refined and dense such that surface roughness may be decreased and uniform surface roughness may be obtained in the range of Al:(Al+Mg) limited in the present invention. Contents of the foregoing additive elements may be in ranges of 0.005% to 0.1%. When the contents thereof are less than 0.005%, effects of addition may not be obtained, and when the contents are greater than 0.1%, floating matters may be formed in the plating bath or no further effect may be obtained. Therefore, the contents of the foregoing additive elements may be in ranges of 0.005% to 0.1%.

Hereinafter, a hot dip Zn alloy plated steel sheet of the present invention will be described in detail.

The hot dip Zn alloy plated steel sheet of the present invention includes an underlying steel sheet and a hot dip Zn alloy plating layer. A composition of the hot dip Zn alloy plating layer may include 1 to 3 wt % of Al, 1.5 to 4.0 wt % of Mg, and Zn and unavoidable impurities as a remainder, in which Al+Mg may be in a range of 2.5 to 7.0 wt % and Al:(Al+Mg) may be in a range of 0.38 to 0.48.

In the hot dip Zn alloy plated steel sheet of the present invention, alloy phases of the hot dip Zn alloy plating layer may include a Zn—Al—$MgZn_2$ ternary eutectic structure and a Zn—$MgZn_2$ binary eutectic structure as a main structure, and a Zn single phase structure may be included in an amount of 10% or less and a $MgZn_2$ structure may be included as a remainder.

Zinc may form corrosion products, such as zincite (ZnO), hydrozincite ($Zn_5(CO_3)_2(OH)_6$), and simonkolleite ($Zn_5$ (OH)$_8$Cl$_2$), in a corrosive environment, and the simonkolleite as a dense corrosion product has an excellent corrosion inhibition effect. Since Mg in the plating layer of a Zn—Al—Mg system plated steel sheet promotes the generation of simonkolleite to improve the corrosion resistance of the plating layer, the present invention controls a Zn single phase structure to be included in an amount of 10% or less. When the Zn single phase structure is formed in an amount greater than 10%, corrosion resistance may deteriorate due to a decrease in the generation of simonkolleite in a corrosive environment.

In a hot dip plating process, appropriate roughness is generally provided to a surface by performing a skin pass after plating. Surface roughness of a steel plate is an important factor that affects an improvement of workability during press forming and image clarity after coating, and needs to be managed.

For this purpose, a roll having an appropriate surface roughness is used to perform the skin pass such that roughness may be provided to the surface of a steel sheet by transferring the roughness of the roll. When the surface of a plating layer is rough, it is difficult to uniformly transfer the roughness of the roll to the steel sheet and therefore, the surface roughness may also be non-uniform after performing the skin pass. That is, the smoother the surface of the plating layer is, the easier the roughness of the skin pass roll may be uniformly transferred to the steel sheet. Thus, roughness of the plating layer before performing the skin pass may be controlled to be as small as possible. Therefore, the surface roughness (Ra) of the hot dip Zn alloy plated steel sheet of the present invention may be controlled to an amount of 2 μm or less.

Figure 2:
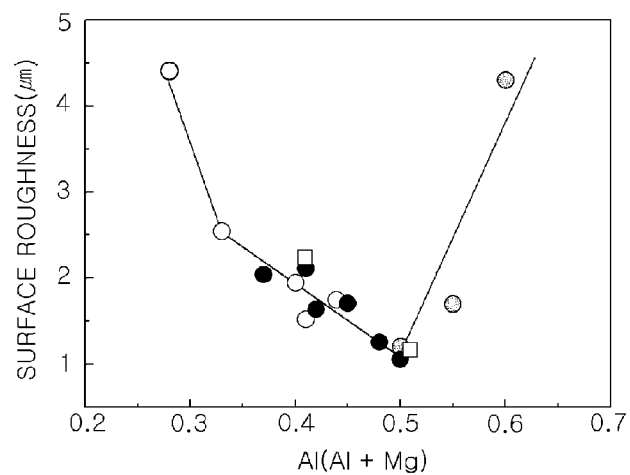
FIG. 2 is a graph showing variations of surface roughness of a hot dip zinc (Zn) alloy plated steel sheet according to the change of Al:(Al+Mg)

FIG. 2 is the results of comparing the roughnesses of plating layers according to the changes of Al:(Mg+Al), and it may be understood that the surface roughness of the plating layer may be too rough when a value of Al:(Mg+Al) is less than 0.38, and the control of surface roughness may also be difficult due to additive elements of the plating bath and cooling rate.

Phosphorous (P) may be adhered to the surface of the hot dip Zn alloy plated steel sheet of the present invention in a range of 0.01 mg/m$^2$ to 500 mg/m$^2$. Phosphorous is adhered through a spraying of a phosphate aqueous solution during cooling in a process of manufacturing the hot dip Zn alloy plated steel sheet to be described later. There may be an effect of improving cooling capacity during cooling according to the adhered phosphorous, but surface defects may be generated when the content thereof is greater than 500 m g/m$^2$. Therefore, the upper limit thereof may be 500 mg/m$^2$.

Hereinafter, a method of manufacturing a hot dip Zn alloy plated steel is described in detail.

The method of manufacturing the hot dip Zn alloy plated steel of the present invention includes:

preparing the foregoing hot dip Zn alloy plating bath;

dipping an underlying steel sheet in the hot dip Zn alloy plating bath to manufacture a plated steel sheet by performing plating; and cooling the plated steel sheet after gas wiping.

The plating may be performed in a hot dip Zn alloy plating bath temperature range of 420° C. to 450° C. In general, a solidification reaction of a hot dip Zn plating layer ends at a temperature of about 420° C. On the other hand, since solidification of the plating layer of the hot dip Zn alloy plated steel in the present invention starts at a temperature of 400° C. or less and ends at a temperature of about 350° C., the plating layer of the hot dip Zn alloy plated steel may have a wide range of solidification temperatures and a cooling rate in the solidification temperature range may affect the structure and surface qualities of the plating layer. Therefore, the temperature of the hot dip Zn alloy plating bath of the present invention may be set to be within a range of 420° C. to 450° C., lower than that of a typical plating bath.

Coating weight is adjusted through a gas wiping treatment after plating. The gas wiping treatment may be performed by using air or nitrogen and for example, may be use nitrogen. The reason for this is that surface defects may be generated in the plating layer by preferential oxidation of magnesium on the surface of the plating layer when the air is used. The gas wiping is for controlling the coating weight and the method thereof is not particularly limited.

The cooling may be performed at a cooling rate of 10° C./s or more. The cooling may be performed until solidification ends immediately after gas wiping and may be performed by spraying air. When the cooling rate is lower than 10° C./s, a crystal structure of the plating layer is coarse and corrosion resistance and surface quality deteriorate due to the formation of a Zn single phase. Therefore, cooling may be performed at a cooling rate of 10° C./s or more.

At this time, a pressure of the sprayed air may be 300 mbar or less. This is for preventing damage to the plating layer during a solidification process, in which liquid and solid phases coexist.

Meanwhile, the cooling may be performed by spraying a phosphate aqueous solution together with air during cooling. The reason for this is that a plating layer having a fine surface appearance may be obtained by increasing a cooling rate to 12° C./s or more by spraying the phosphate aqueous solution. A reaction for the polymerization of a phosphate component, adhered to the steel sheet by means of the sprayed phosphate aqueous solution, through a condensation reaction, is an endothermic reaction and therefore, the cooling rate may be increased.

The phosphate used at this time may be ammonium hydrogen phosphate, ammonium calcium phosphate, or ammonium sodium phosphate, and a concentration of the phosphate in the aqueous solution may be in a range of 0.01% to 5.0%. As described above, this is for controlling the content of the phosphate adhered to the surface in a range of 0.01 mg/m$^2$ to 500 mg/m$^2$.

A method of spraying the air and phosphate aqueous solution uses a two-fluid spraying nozzle, a spraying pressure of the phosphate aqueous solution may be in a range of 0.3 kgf/cm$^2$ to 5.0 kgf/cm$^2$, and a spraying pressure of the air may be in a range of 0.5 kgf/cm$^2$ to 7.0 kgf/cm$^2$. The reason for this is that the spraying of the solution is insufficient when spraying pressures are lower than appropriate ranges, and when the spraying pressures are greater than the appropriate ranges, impact pressure of a droplet is increased such that pitting defects having a dot shape may be generated in the plating layer.

Meanwhile, droplets of the sprayed phosphate aqueous solution may be electrostatically charged by passing through a mesh-type electrode charged in a range of −1 KV to −40 KV. The foregoing range is for obtaining a uniform and fine droplet. When a voltage is −1 KV or less, pitting marks may be generated in the plating layer because an atomization effect of the droplet may not be obtained and large droplets remain, and when the applied voltage is high of −40 KV or more, electric sparks may be generated between the charged electrode and the steel sheet. Therefore, the droplet may be charged in a range of −1 KV to −40 KV.

MODE FOR THE INVENTION

Hereinafter, examples of the present invention are described in more detail. The following examples are merely provided to allow for a clearer understanding of the present invention, rather than to limit the scope thereof.

EXAMPLE 1

In a hot dip plating apparatus continuously plating a steel strip, hot dip Zn alloy plating was performed under the following conditions by using a 0.8 mm thick low carbon cold-rolled steel sheet as an underlying steel sheet. At this time, nitrogen gas was used for gas wiping to manufacture a plated steel sheet having various coating weights. Time, elapsed until a rust generation area on a sample surface was 5% through a salt spray test (a salt spray standard test equivalent to KS-C-0223), was measured and the results thereof are presented in FIG. 3.

- Conditions of continuous reduction furnace: maximum temperature of steel sheet 780° C., dew point temperature −40° C.
- Plating bath composition: Table 1
- Plating bath temperature and dipping time: 440° C., 3 seconds
- Cooling rate of steel sheet after plating: 10° C./s (air spraying)

TABLE 1

Figure 3:
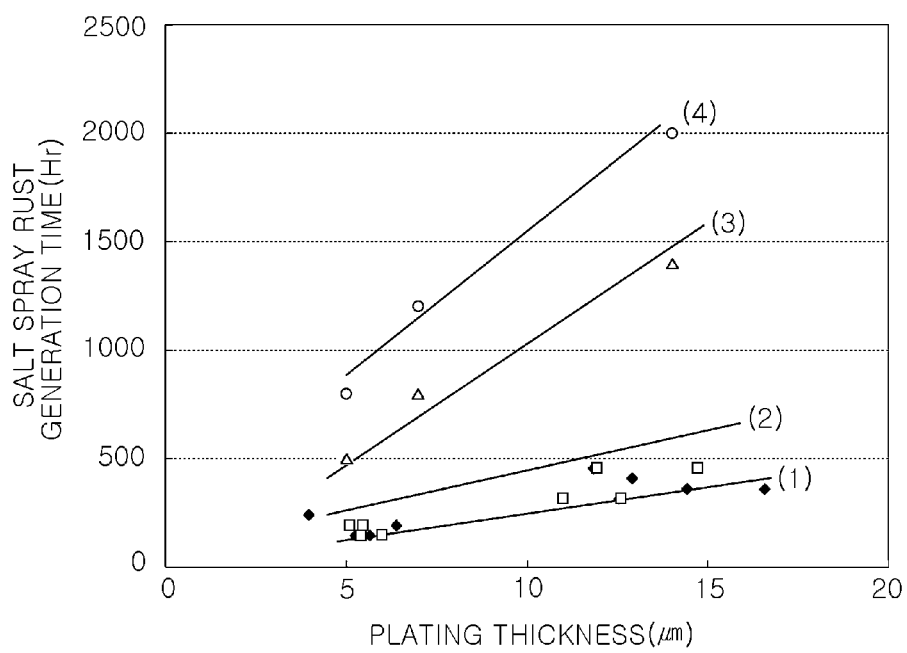
FIG. 3 is a graph showing the results of Example 1.

| Category | Plating bath composition | | | Al + Mg | Al:(Al + Mg) | Results in FIG. 3 |
| --- | --- | --- | --- | --- | --- | --- |
| | Zn | Al | Mg | | | |
| Comparative Example 1-1 | 97 | 1.5 | 1.5 | 3 | 0.5 | Line (1) |
| Comparative Example 1-2 | 93 | 4 | 3 | 7 | 0.57 | Line (2) |
| Inventive Example 1-1 | 95 | 2 | 3 | 5 | 0.4 | Line (3) |
| Inventive Example 1-2 | 93.8 | 2.5 | 4 | 6.2 | 0.38 | Line (4) |

As shown in FIG. 3, it may be confirmed that the Inventive Examples satisfying the concentration conditions of Al and Mg of the present invention had excellent salt spray corrosion resistances in comparison to the Comparative Examples.

EXAMPLE 2

Meanwhile, Example 2 was performed in order to confirm corrosion resistance of a hot dip Zn alloy plated steel sheet through the relationship between the plating bath composition and the plated structure.

In a hot dip plating apparatus continuously plating a steel strip, hot dip Zn alloy plating of Example 2 was performed under the following conditions by using a 0.8 mm thick low carbon cold-rolled steel sheet as an underlying steel sheet. At this time, nitrogen gas was used for gas wiping to manufacture a plated steel sheet having a one-side coating weight of 60 g/m$^2$. Time, which was elapsed until a rust generation area on a sample surface was 5% through a salt spray test (a salt spray standard test equivalent to KS-C-0223), was measured and the results thereof are presented in Table 2.

- Conditions of continuous reduction furnace: maximum temperature of steel sheet 780° C., dew point temperature −40° C.
- Plating bath composition: Table 1
- Plating bath temperature and dipping time: 440° C., 3 seconds
- Cooling rate of steel sheet after plating: 10° C./s (air spraying)

Meanwhile, an area occupied by a Zn single phase in a cross-sectional structure of the plating layer was presented in Table 2, and the presence of other metal phases was expressed by O/X.

TABLE 2

| Category | Plating bath composition (wt %) | | | | | Plated structure (%) | | | | | Rust generation time (Hr) |
| --- | --- | --- | --- | --- | --- | --- | --- | --- | --- | --- | --- |
| | Al | Mg | Al + Mg | Al:(Al + Mg) | others | Zn single phase | Zn—Al binary phase | MgZn$_2$ phase | Zn—MgZn$_2$ binary alloy phase | Zn—Al—MgZn$_2$ ternary alloy phase | |
| Comparative Example 2-1 | 0.02 | 0 | 0.02 | 1 | | 30 | | | | | 95 |
| Comparative Example 2-2 | 0.8 | 1 | 1.8 | 0.44 | | 30 | O | X | O | O | 168 |
| Comparative Example 2-3 | 0.8 | 1 | 1.8 | 0.44 | Si (0.04) | 30 | O | X | O | O | 168 |
| Comparative Example 2-4 | 2 | 2 | 4 | 0.5 | | 25 | O | X | O | O | 240 |
| Comparative Example 2-5 | 5 | 2.5 | 7.5 | 0.66 | | 15 | O | X | X | O | 360 |
| Comparative Example 2-6 | 5 | 2.5 | 7.5 | 0.66 | Si (0.02) | 15 | O | X | X | O | 360 |
| Comparative Example 2-7 | 2.3 | 5 | 7.3 | 0.31 | | 7 | X | O | O | O | 720 |
| Inventive Example 2-1 | 2 | 3 | 5 | 0.4 | | 7 | X | X | O | O | 1440 |

TABLE 2-continued

| Category | Plating bath composition (wt %) | | | | | Plated structure (%) | | | | | Rust generation time (Hr) |
|---|---|---|---|---|---|---|---|---|---|---|---|
| | Al | Mg | Al + Mg | Al:(Al + Mg) | others | Zn single phase | Zn—Al binary phase | MgZn$_2$ phase | Zn—MgZn$_2$ binary alloy phase | Zn—Al—MgZn$_2$ ternary alloy phase | |
| Inventive Example 2-2 | 1.2 | 1.5 | 2.7 | 0.44 | | 9 | X | X | ○ | ○ | 720 |
| Inventive Example 2-3 | 3 | 4 | 7 | 0.42 | | 5 | X | X | ○ | ○ | 1440 |
| Inventive Example 2-4 | 2.5 | 3.3 | 5.8 | 0.43 | | 7 | X | X | ○ | ○ | 1440 |
| Inventive Example 2-5 | 2.5 | 3.3 | 5.8 | 0.43 | | 7 | X | X | ○ | ○ | 1440 |
| Inventive Example 2-6 | 3 | 4 | 7 | 0.42 | Si (0.04) | 3 | X | X | ○ | ○ | 1680 |
| Inventive Example 2-7 | 2 | 3 | 5 | 0.4 | Li (0.03) | 5 | X | X | ○ | ○ | 1920 |
| Inventive Example 2-8 | 2.5 | 3.3 | 5.8 | 0.43 | Si + Li (0.05) | 3 | X | X | ○ | ○ | 1680 |
| Inventive Example 2-9 | 3 | 4 | 7 | 0.42 | Si + P (0.06) | 5 | X | X | ○ | ○ | 1920 |

As shown in Table 2, it may be understood that the plating layer satisfying the plating bath composition of the present invention was mainly composed of Zn—MgZn$_2$ binary phase and Zn—Al—MgZn$_2$ ternary phase eutectic structures, and at this time, corrosion resistance was improved.

Comparative Examples belonged to the case in which a Zn single phase structure was included in an amount greater than 10% and it may be confirmed that corrosion resistances thereof were inferior. Although satisfactory corrosion resistance was obtained with respect to Comparative Example 2-7 when the respective concentrations of Al and Mg were 2.3 wt % and 5 wt %, surface roughness may be rough because coarse MgZn$_2$ single phases existed in the plating layer when the Al:(Mg concentration+Al concentration) ratio was less than 0.38, which was suggested in the present invention. Therefore, Comparative Example 2-7 was classified as one of Comparative Examples.

In particular, with respect to Inventive Examples 2-6 to 2-9 in which additives were used, it may be understood that an effect of improving corrosion resistance was increased because Zn—MgZn$_2$ binary phase eutectic structures of Inventive Examples 2-6 to 2-9 were finer in comparison to those of Inventive Examples without having the additives.

EXAMPLE 3

In Example 3, different from the foregoing Example 2, experiments were performed by using a 2.6 mm thick low carbon hot-rolled steel sheet as an underlying steel sheet. Process conditions except a plating bath composition were the same as those of Example 2 and a plated steel sheet having a one-side coating weight of 90 g/m$^2$ was manufactured in Example 3.

Meanwhile, crystal structures constituting the plating layer were observed and time, which was elapsed until a rust generation area on a sample surface was 5% through a salt spray test, was measured, and the results thereof are compared in Table 3.

TABLE 3

| Category | Plating bath composition (wt %) | | | | | Plated structure (%) | | | | | Rust generation time (Hr) |
|---|---|---|---|---|---|---|---|---|---|---|---|
| | Al | Mg | Al + Mg | Al:(Al + Mg) | others | Zn single phase | Zn—Al binary phase | MgZn$_2$ phase | Zn—MgZn$_2$ binary alloy phase | Zn—Al—MgZn$_2$ ternary alloy phase | |
| Comparative Example 3-1 | 5 | 2.5 | 7.5 | 0.66 | | 15 | ○ | X | | ○ | 360 |
| Comparative Example 3-2 | 5 | 2.5 | 7.5 | 0.66 | Si (0.02) | 14 | ○ | X | | ○ | 360 |
| Comparative Example 3-3 | 2.3 | 5 | 7.3 | 0.31 | | 7 | X | ○ | ○ | ○ | 720 |

TABLE 3-continued

| Category | Plating bath composition (wt %) | | | | | Plated structure (%) | | | | | Rust generation time (Hr) |
|---|---|---|---|---|---|---|---|---|---|---|---|
| | Al | Mg | Al + Mg | Al:(Al + Mg) | others | Zn single phase | Zn—Al binary phase | $MgZn_2$ phase | Zn—$MgZn_2$ binary alloy phase | Zn—Al—$MgZn_2$ ternary alloy phase | |
| Inventive Example 3-1 | 2 | 3 | 5 | 0.4 | | 6 | X | X | ○ | ○ | 1440 |
| Inventive Example 3-2 | 1.2 | 1.5 | 2.7 | 0.44 | | 9 | X | X | ○ | ○ | 720 |
| Inventive Example 3-3 | 3 | 4 | 7 | 0.42 | | 5 | X | X | ○ | ○ | 1440 |
| Inventive Example 3-4 | 2.5 | 3.3 | 5.8 | 0.43 | | 5 | X | X | ○ | ○ | 1440 |
| Inventive Example 3-5 | 2.5 | 3.3 | 5.8 | 0.43 | Li (0.04) | 4 | X | X | ○ | ○ | 1440 |
| Inventive Example 3-6 | 3 | 4 | 7 | 0.42 | Si (0.04) | 3 | X | X | ○ | ○ | 1680 |

As shown in Table 3, from the results of Table 3 obtained by using a low carbon hot-rolled steel sheet similar to the results of Table 2 obtained by using a cold-rolled steel sheet, it may be confirmed that excellent corrosion resistance was obtained when the plating bath composition of the present invention was satisfied.

EXAMPLE 4

In Example 4, experiments were performed in order to discover effects on the cooling rate after plating.

In a hot dip plating apparatus continuously plating a steel strip, scales of a 2.6 mm thick low carbon hot-rolled steel strip were removed by using a method such as pickling and hot dip Zn alloy plating of Example 4 was then performed under the following conditions having a constant plating composition. One-side coating weight was adjusted to an amount of 60 g/m², and a cooling rate of the steel sheet in a solidification range of the plating layer was then varied in a range of 1° C./s to 15° C./s by using only air spraying type cooling or both air spraying type cooling chamber and electrostatic charge type phosphate aqueous solution spraying. Surface qualities of the plated steel sheet and time, which was elapsed until a rust generation area on a sample surface was 5% through a salt spray test (a salt spray standard test equivalent to KS-C-0223), were measured, and the results thereof are presented in Table 4.

Conditions of continuous reduction furnace: maximum temperature of steel sheet 550° C., dew point −40° C.

Plating bath composition/temperature/dipping time: 2.5 wt % of Al, 3.5 wt % of Mg/450° C./3 seconds Spraying conditions of phosphate aqueous solution: spraying pressure of phosphate aqueous solution 2.0 kgf/cm², air spraying pressure 3.0 kgf/cm², applied high voltage strength −20 KV

TABLE 4

| Category | Cooling method | | Cooling rate (° C./s) | Rust generation time (Hr) |
|---|---|---|---|---|
| | Air cooling | Phosphate spraying | | |
| Comparative Example 4-1 | ○ | X | 5 | 660 |
| Comparative Example 4-2 | ○ | X | 7 | 860 |
| Comparative Example 4-3 | ○ | X | 9 | 900 |
| Inventive Example 4-1 | ○ | X | 10 | 1240 |
| Inventive Example 4-2 | ○ | X | 12 | 1440 |
| Inventive Example 4-3 | ○ | ○ | 14 | 1680 |

As shown in Table 4, it may be understood that corrosion resistance tended to decrease when the cooling rate was less than 10° C./s, which was slower than that of the present invention, and corrosion resistance improves when the cooling rate was 10° C./s or more. Therefore, it may be confirmed that the cooling rate in the present invention may be 10° C./s or more.

EXAMPLE 5

Example 5 was performed in order to confirm desirable conditions during cooling by using phosphate aqueous solution spraying. Hot dip Zn alloy plating of Example 5 was performed under the following conditions by using a 0.8 mm thick low carbon cold-rolled steel strip, and a plated steel sheet having a one-side coating weight of 60 g/m² manufactured by gas wiping. Surface appearance of the plated steel and blackening of the plating layer were measured and the results thereof are presented in Table 5.

Conditions of continuous reduction furnace: maximum temperature of steel sheet 780° C., dew point −40° C.

Plating bath composition: 2 wt % of Al, 3 wt % of Mg

Plating bath temperature and dipping time: 440° C., 3 seconds

Solution spraying and high voltage conditions: see Table 5

Surface appearance was visually observed, and a uniform surface without external plating layer ripple or stripe marks was denoted by ○, fine ripple or stripe marks were denoted by Δ and apparent ripple or stripe marks was denoted by X. Also, blackening was determined by measuring the whiteness of a plating layer after manufacturing the plating layer and whiteness after 3 months had elapsed after the manufacturing of the plating layer. When the difference thereof was less than 2, blackening resistance was denoted by ○, blackening resistance was denoted by Δ when the difference was in a range of 2 to 5, and blackening resistance was denoted by X when the difference was greater than 5.

TABLE 5

| Category | Phosphate aqueous solution concentration (%) | Applied high voltage (KV) | Spraying pressure (kgf/cm$^2$) Aqueous solution | Air | Temperature of solution sprayed steel sheet (° C.) | Coating weight of P (mg/m$^2$) | Surface appearance | Blackening resistance |
|---|---|---|---|---|---|---|---|---|
| Inventive Example 5-1 | 0.5 | −40 | 0.3 | 0.5 | 420-340 | 0.1 | ○ | ○ |
| Inventive Example 5-2 | 0.1 | −30 | 1.8 | 3 | 400-340 | 0.3 | ○ | ○ |
| Inventive Example 5-3 | 5 | −1 | 1.8 | 3 | 400-340 | 1.5 | ○ | ○ |
| Inventive Example 5-4 | 5 | −40 | 5 | 7 | 420-340 | 500 | ○ | ○ |
| Inventive Example 5-5 | 0.5 | −20 | 1.8 | 3 | 420-340 | 1.5 | ○ | ○ |
| Comparative Example 5-1 | 0 | −1.8 | 3 | 0.5 | 420-340 | 0 | X | X |
| Comparative Example 5-2 | 0 | −50 | 5 | 7 | 420-340 | 0 | X | X |
| Comparative Example 5-3 | 0.5 | 0 | 1.8 | 3 | 420-340 | 0.01 | Δ | Δ |
| Comparative Example 5-4 | 0.5 | −20 | 1.8 | 3 | 420-410 | 0.3 | Δ | Δ |

As shown in Table 5, Inventive Examples, which satisfied the phosphate concentration requirement, applied high voltage strength, and solution spraying conditions suggested in the present invention, had fine surface appearances. On the other hand, in Comparative Examples having conditions beyond the ranges suggested in the present invention, it may be confirmed that surface appearances of the plating layers were poor because ripple marks or the like were observed and blackening resistances were also inferior.

While the present invention has been shown and described in connection with the exemplary embodiments, it will be apparent to those skilled in the art that modifications and variations can be made without departing from the spirit and scope of the invention as defined by the appended claims.

The invention claimed is:

1. A high corrosion resistant hot dip zinc (Zn) alloy plated steel sheet comprising:
an underlying steel sheet; and
a hot dip Zn alloy plating layer,
wherein a composition of the hot dip Zn alloy plating layer includes about 2.3 wt. % to about 3 wt. % of aluminum (Al), about 1.5 wt. % to about 3.3 wt. % of magnesium (Mg), and Zn and unavoidable impurities as a remainder, in which Al+Mg is in a range of about 3.8 wt. % to about 6.3 wt. % and Al/(Al+Mg) is a weight ratio in a range of about 0.41 to about 0.48, wherein the hot dip Zn alloy plated steel sheet is subjected to skin pass rolling, and wherein a surface roughness (Ra) of the hot dip Zn alloy plated steel sheet is about 2 μm or less before performing the skin pass rolling, and wherein the hot dip Zn alloy plating layer comprises a plated structure, in which a Zn—MgZn$_2$ binary eutectic structure is dispersed in a matrix of a Zn—Al—MgZn$_2$ ternary eutectic structure, a Zn single phase structure is included in an amount of about 10% by area or less, and a MgZn$_2$ structure is included as a remainder.

2. The high corrosion resistant hot dip Zn alloy plated steel sheet of claim 1, wherein the plating layer further comprises one or more selected from the group consisting of silicon (Si), lithium (Li), titanium (Ti), lanthanum (La), cerium (Ce), boron (B), and phosphorous (P) in total amount of about 0.1 wt. % or less.

3. The high corrosion resistant hot dip Zn alloy plated steel sheet of claim 1, wherein phosphorous (P) is adhered to a surface of the plating layer and a content thereof is in a range of about 0.1 mg/m$^2$ to about 500 mg/m$^2$.

* * * * *